(12) United States Patent
Fukashiro et al.

(10) Patent No.: US 6,341,032 B1
(45) Date of Patent: Jan. 22, 2002

(54) METHOD AND SYSTEM FOR REDUCING OPTICAL SURGE

(75) Inventors: Yasuyuki Fukashiro, Ohta; Hideaki Tsushima, Komae; Yukio Hayashi, Fujisawa, all of (JP)

(73) Assignee: Hitachi, Ltd., Yokohama (JP)

( * ) Notice: Subject to any disclaimer, the term of this patent is extended or adjusted under 35 U.S.C. 154(b) by 0 days.

(21) Appl. No.: 09/338,727

(22) Filed: Jun. 23, 1999

(30) Foreign Application Priority Data

Jun. 23, 1998 (JP) .......................................... 10-175581

(51) Int. Cl.$^7$ ................................................ H01S 3/00
(52) U.S. Cl. ....................................... 359/337; 359/341
(58) Field of Search .................................. 359/337, 341

(56) References Cited

U.S. PATENT DOCUMENTS 5,864,422 A * 1/1999 Miyazaki et al. ............ 359/341
5,923,463 A * 7/1999 Hamada ...................... 359/341
6,078,422 A * 6/2000 Kosaka et al. .............. 359/341

OTHER PUBLICATIONS

OFC '98 Post Deadline Paper by Chang, et al., entitled "Performance and operation of WDM layer automatic protection switching in a 1177 km reconfigurable multiwavelength ring network," 1998, 6 pages.

Paper B–1083 by Kitajima, et al., entitled "Characteristics of low insertion loss optical cross connect system for large capacity transmissions," *Academy of Electronics Information Telecommunication*, 1996, p. 568.

Paper B–941 by Yoneyama, et al., entitled "A consideration of optical surge in optical amplifier systems," *Spring Session, Academy of Electronics Information and Telecommunication*, 1993, p. 4–79.

Paper B–10–176 by Hirayama, et al., entitled "An Optical Surge Suppression Scheme in Photonic Networks," *Conference of Telecommunication Society, Academy of Electronics Information and Telecommunication*, 1997, p. 475.

Paper B–10–177 by Tokura, et al., entitled "Analysis of Optical Surge Propagation On Amplified Transmission Systems," *Conference of Telecommunication Society, Academy of Electronics Information and Telecommunication*, 1997, p. 476.

* cited by examiner

Primary Examiner—Stephen C. Buczinski
(74) Attorney, Agent, or Firm—Knoble & Yoshida, LLC

(57) ABSTRACT

The method and system are disclosed for reducing an optical surge in an optical data communication system that includes at least pair of optical lines, optical switches and optical amplifiers to maintain high reliability in data transmission. The optical surge is substantially reduced or suppressed by assuring a proper timing of the optical switch operation based upon a predetermined elapsed time or a predetermined safe amplification gain of the optical amplifier.

31 Claims, 16 Drawing Sheets

METHOD AND SYSTEM FOR REDUCING OPTICAL SURGE

BACKGROUND OF THE INVENTION

FIELD OF THE INVENTION

The current invention is related to a method of and an apparatus for substantially reducing an optical surge which is caused by an optical amplifier during a switch between optical lines.

In the recent years, as the global data communication such as the Internet becomes readily available, improvements in the capacity and the speed of the data communication between terminal devices are highly desirable. In order to accommodate such demands, optical communication systems including optical fibers and operational control devices have been introduced. Since the optical lines carry an increased amount of data per line, the optical communication systems are generally more susceptible to a large amount of data loss due to a problem in the communication line.

In order to improve the reliability of the optical communication system, one implementation includes a duplicate pair of optical lines and an optical switch device for switching from one optical line to another in case of a line problem. Optical switches are generally grouped into a mechanical type, a frequency type and a wave guidance type. The mechanical type switch mechanically moves an optical fiber or a lens to switch from one line to another. The frequency type switch includes an element such as an optical filter to cause the switch. Lastly, the wave guidance type switch includes an element having material such as polymer, semiconductor or quartz. This implementation not only increases reliability, but also simplifies over the prior art communication systems where an additional device is needed for converting an optical signal to an electrical signal in case of a line problem. The simplification also reduces the physical size as well as the cost for implementing an optical communication system.

Another optical device to increase the reliability of the optical data communication system is an optical amplifier. Since an optical signal is attenuated by a number of factors such as the distance of an optical line, an optical switch, a splitter used in a wavelength division multiplier, an optical filter and so on, the attenuated optical signal must be amplified by a series of optical amplifiers along the optical line. If an optical signal is failed in one optical line, the optical switch changes lines to maintain the signal level by properly amplifying the optical signal. Examples of a combination of the above described optical switch and optical amplifier are disclosed in publications such as "Postdeadline Papers, PD25" Optical Fiber Communication Conference, 1998. Another paper, B-1083 in Academy of Electronics Information Telecommunication (1996) discloses a multiple-line optical cross connect system including an optical monitor, a 4×4 optical switch and a control unit.

The combined use of an optical switch and an optical amplifier may cause an optical surge during a switch transition. There is a finite delay in time when the optical switch closes a contact from one optical line to another. During the delay, the newly switched line experiences the lack of an optical signal and then a sudden increase in the optical signal which is fed into an optical amplifier. This set of events causes an optical surge in the output of the optical amplifier. The optical surge may be worsened by further amplification by a series of optical amplifiers. The optical surge generally damages certain components such as optical receivers and connectors in the optical data communication system and interrupts the optical signal transmission. Furthermore, the optical surge may harm the human operator of the optical data communication system. For these and other reasons, the optical surge must be substantially reduced to eliminate the undesirable effects.

In order to suppress an optical surge, prior attempts have included different methods. Prior art references, B-941 Spring Session, Academy of Electronics Information and Telecommunication, 1993 and B-10-177, Conference of Telecommunication Society, Academy of Electronics Information and Telecommunication, 1997 disclose delaying an optical input to an optical line. However, these prior art disclosures fail to consider an optical amplifier in an optical system and lack any consideration for applying the technique to an optical system having an optical amplifier. Another prior art reference, B-10-176, Conference of Telecommunication Society, Academy of Electronics Information and Telecommunication, 1997 discloses a technique of shutting off of an excitation light source for an optical amplifier upon terminating an input to the optical amplifier. This prior art technique lacks disclosures on the timing of the termination of the excitation light source with respect to the onset of switching optical lines. Lastly, the same B-10-176 prior art reference also discloses a technique for inputting a control light into an optical amplifier. This prior art technique not only lacks disclosures on the timing of inputting the control light with respect to the onset of switching optical lines, but also requires additional expensive pieces of equipment for emitting the control light.

A cost-effective method and device for substantially reducing an optical surge is highly desired.

SUMMARY OF THE INVENTION

In order to solve the above and other problems, according to a first aspect of the current invention, a method of reducing an optical surge caused by optical amplifiers while switching from a first optical line to a second optical line, including the acts of: detecting a predetermined line switching signal indicative of switching the first optical line to the second optical line; altering an amplification gain of at least one of the optical amplifiers towards a predetermined safe gain range upon detecting the predetermined line switching signal; detecting that the amplification gain is within the predetermined safe amplification gain range; and switching from the first optical line to the second optical line upon detecting the predetermined safe gain range, wherein undesirable effects of the optical surge is substantially reduced to an acceptable level.

According to a second aspect of the current invention, a method of reducing an optical surge caused by optical amplifiers while switching from a first optical line to a second optical line, including the acts of: detecting a predetermined line switching signal indicative of switching the first optical line to the second optical line; initiating a change in amplification gain at a predetermined rate in at least one of the optical amplifiers towards a predetermined safe value upon detecting the predetermined line switching signal; timing an elapse of a predetermined amount of time after the initiating act so that the amplification gain at least reaches the predetermined safe value; and switching from the first optical line to the second optical line after the elapse of the predetermined amount of time, wherein an amount of the optical surge is substantially reduced for undesirable effects.

According to a third aspect of the current invention, an optical surge reduction apparatus including: an optical switch for switching between a first optical line and a second optical line in response to a switch drive signal so as to maintain an operational optical line, the first optical line and the second optical line concurrently transmitting a duplicate set of an optical signal; an optical amplifier connected to the optical switch for amplifying the optical signal in the operational optical line at a variable amplification gain; and a control unit connected to the optical switch and the optical amplifier for detecting an optical line failure condition and for changing the variable amplification gain to a predetermined safe amplification gain value in response to the optical line failure condition prior to generating the switch drive signal.

According to a fourth aspect of the current invention, an optical surge reduction unit, including: an optical switch for switching in response to a switch drive signal between a first optical line and a second optical line so as to route an optical signal via either the first optical line or the second optical line; a pair of optical amplifiers each connected to the first optical line and the second optical line for amplifying the optical signal at a variable amplification gain; and a control unit connected to the optical amplifiers and the optical switch for controlling the variable gain to a predetermined safe amplification gain value in response to a routing change signal prior to generating the switch drive signal.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
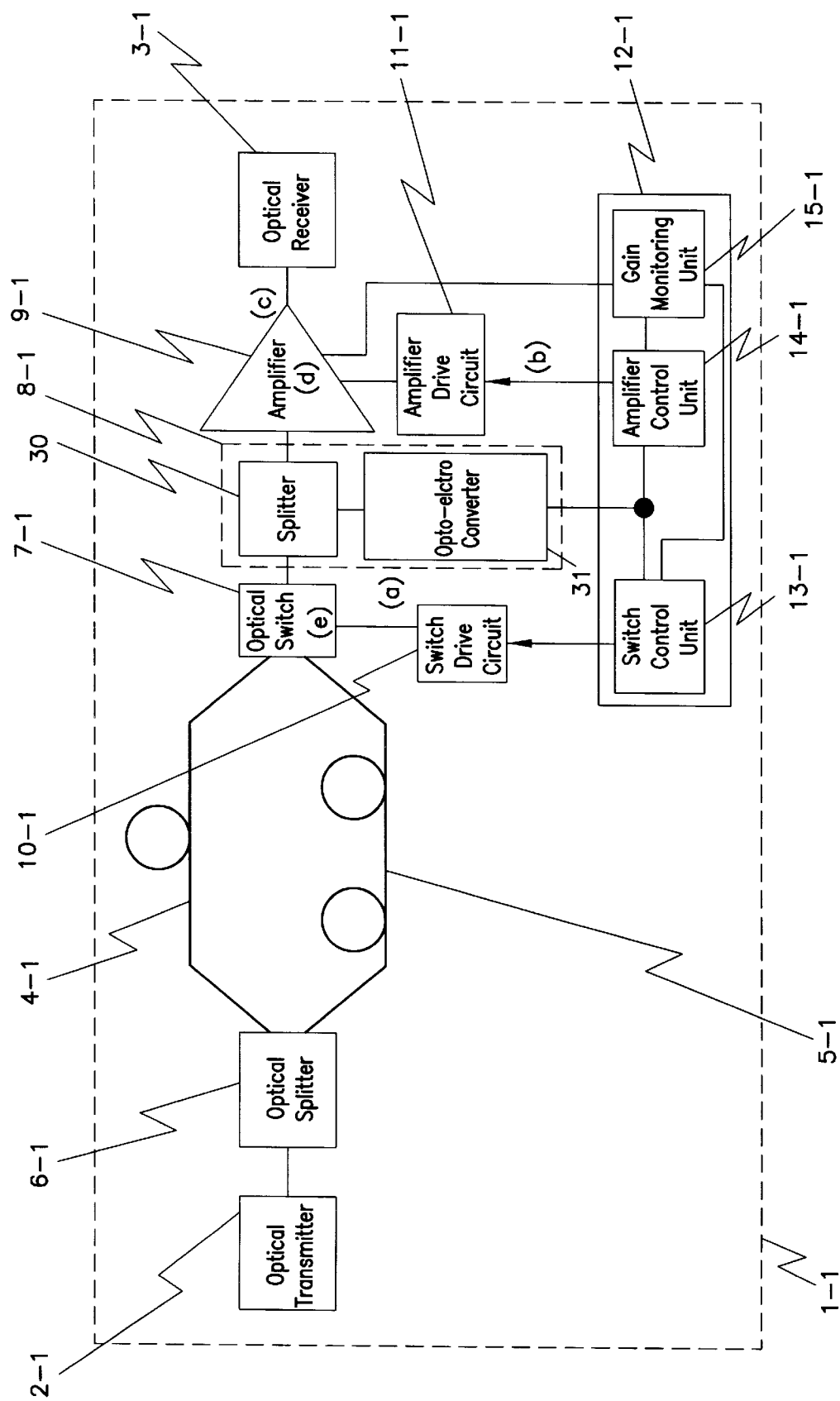
FIG. 1 is a block diagram illustrating a first preferred embodiment of the optical surge reduction apparatus according to the current invention.

Referring now to the drawings, wherein like reference numerals designate corresponding structure throughout the views, and referring in particular to FIG. 1, a first preferred embodiment of the optical surge reduction apparatus 12-1 according to the current invention is illustrated in an optical transmission system 1—1. The optical transmission system 1—1 includes an optical transmitter 2-1 for sending an optical signal to an optical splitter 6-1 such as a 3db optical coupler, which splits the optical signal into dual optical lines 4-1 and 5-1 for carrying the optical signal over distance in a duplicate manner. The dual optical lines include a regular line 4-1 for regular transmission and a back-up line 5-1 for emergency transmission when the regular line 4-1 fails. The optical transmission system 1—1 also includes an optical switch 7-1 for switching between the regular line 4-1 and the back-up line 5-1. The optical switch 7-1 is driven by an optical switch drive circuit 10-1. An optical amplifier 9-1 amplifies an output of the optical switch 7-1, which has been attenuated by attenuating factors such as the distance of the optical line and generates an amplified optical signal. An optical amplifier drive circuit 11-1 drives the optical amplifier 9-1. Finally, an optical receiver 3-1 receives the amplified optical signal.

The first preferred embodiment of the optical surge reduction apparatus 12-1 according to the current invention includes an optical switch control unit 13-1 for controlling the switch drive circuit 10-1, an optical amplifier control unit 14-1 for controlling the optical amplifier drive circuit 11-1 as well as a gain monitoring unit 15-1 for monitoring an amplification gain value of the optical amplifier 9-1. The optical surge reduction apparatus 12-1 receives an electrical input signal from the optical power monitoring unit 8-1 as well as an amplification gain signal from the optical amplifier 9-1. The optical power monitoring unit 8-1 is located between the optical switch 7-1 and the optical amplifier 9-1 and monitors the power level of the output optical signal from the optical switch 7-1. The optical power monitoring unit 8-1 includes an optical splitter 30 for splitting the output optical signal from the optical switch 7-1 and an opto-electro converter 31 for converting an optical signal to the electrical input signal for the optical surge reduction apparatus 12-1.

Still referring to FIG. 1, the first preferred embodiment of the optical surge reduction apparatus 12-1 substantially reduces the risk of having undesirable effects of an optical surge during a switch operation by controlling the onset of the switch operation based upon an amplification gain value. When the optical surge reduction apparatus 12-1 detects an optical power failure based upon the electrical input signal from the optical power monitoring unit 8-1, the optical amplifier control unit 14-1 alters the amplification gain of the optical amplifier 9-1 via the optical amplifier drive circuit 11-1. The gain monitoring unit 15-1 monitors the amplification gain value of the optical amplifier 9-1 and determines whether or not the gain value is within a predetermined safe amplification gain range. When the amplification gain value is within the predetermined safe gain range, the gain monitoring unit 15-1 sends a signal to the optical switch control unit 13-1 for initiating the control of the optical switch 7-1 via the switch drive circuit 10-1. Because the above described switching operation of the optical switch 7-1 does not take place until the amplification gain value is within the predetermined safe amplification gain range, undesirable optical surge is substantially reduced.

Figure 2:
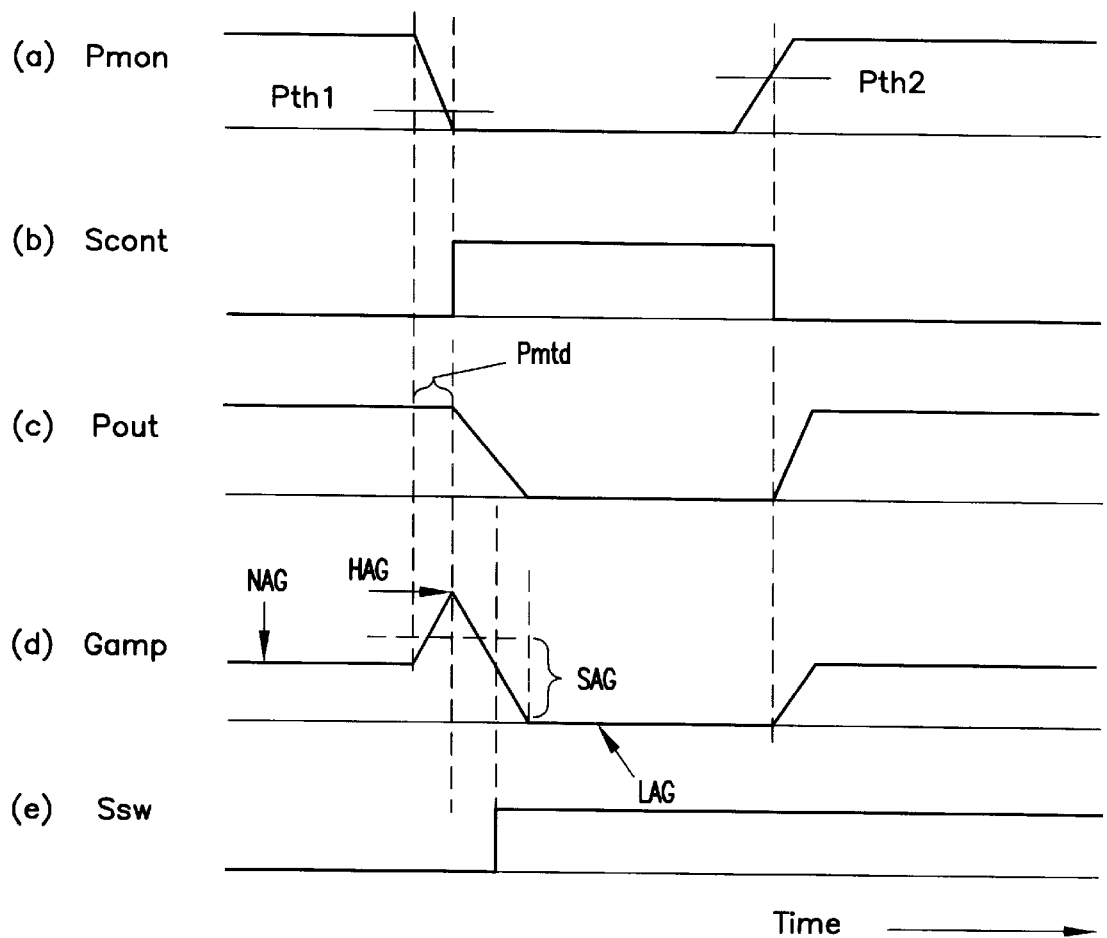
FIG. 2 is a series of timing charts illustrating the dependency of certain components in relation to the first preferred embodiment of the optical surge reduction apparatus according to the current invention.

Now referring to FIG. 2, timing charts illustrate the dependency of certain components of the optical transmission system and the first preferred embodiment of the optical surge reduction apparatus 12-1 according to the current invention. A timing chart (a) delineates that the optical power monitoring unit 8-1 of FIG. 1 monitors the optical power Pmon. While the optical power signal is above a predetermined threshold value Pth1, the optical amplifier 9-1 of FIG. 1 maintains its amplification gain at a predetermined normal amplification gain value NAG. However, as the optical power signal weakens towards the predetermined threshold value Pth1, the optical amplifier attempts to maintain its optical power output as shown in a time period Pmtd in a timing chart (c) Pout by increasing the amplification gain towards a high amplification gain value HAG as shown in a time chart (d) Gamp.

Still referring to FIG. 2, in response to the detection of an optical line failure indicated by the optical power finally reaching at or below the predetermined threshold value Pth1 as shown in a timing chart Pmon (a), the optical amplifier control unit 14-1 of the optical surge reduction apparatus 12-1 generates a drive signal as shown in a timing chart (b) Scont, to alter the amplification gain of the optical amplifier 9-1 via the optical amplifier drive circuit 11-1. The timing chart (d) Gamp shows that the amplification gain of the amplifier 9-1 is reduced towards a predetermined low amplification gain value LAG. As a result of the gain reduction, as shown in the timing chart (c) Pout, the optical amplifier 9-1 reduces its output optical signal. While the amplification gain value is reduced from the high amplification gain value HAG to the low amplification gain value LAG, when the amplification gain value falls within a predetermined safe amplification gain range SAG as shown in the timing chart (d), the optical switch control unit 13-1 of the optical surge reduction apparatus 12-1 generates a switch control signal as shown in a timing chart (e) Ssw. In response to the switch control signal, the switch drive circuit 10-1 causes the optical switch 7-1 to initiate a switch of the failed optical line to another operational one without experiencing detrimental effects of an optical surge.

Figure 3:
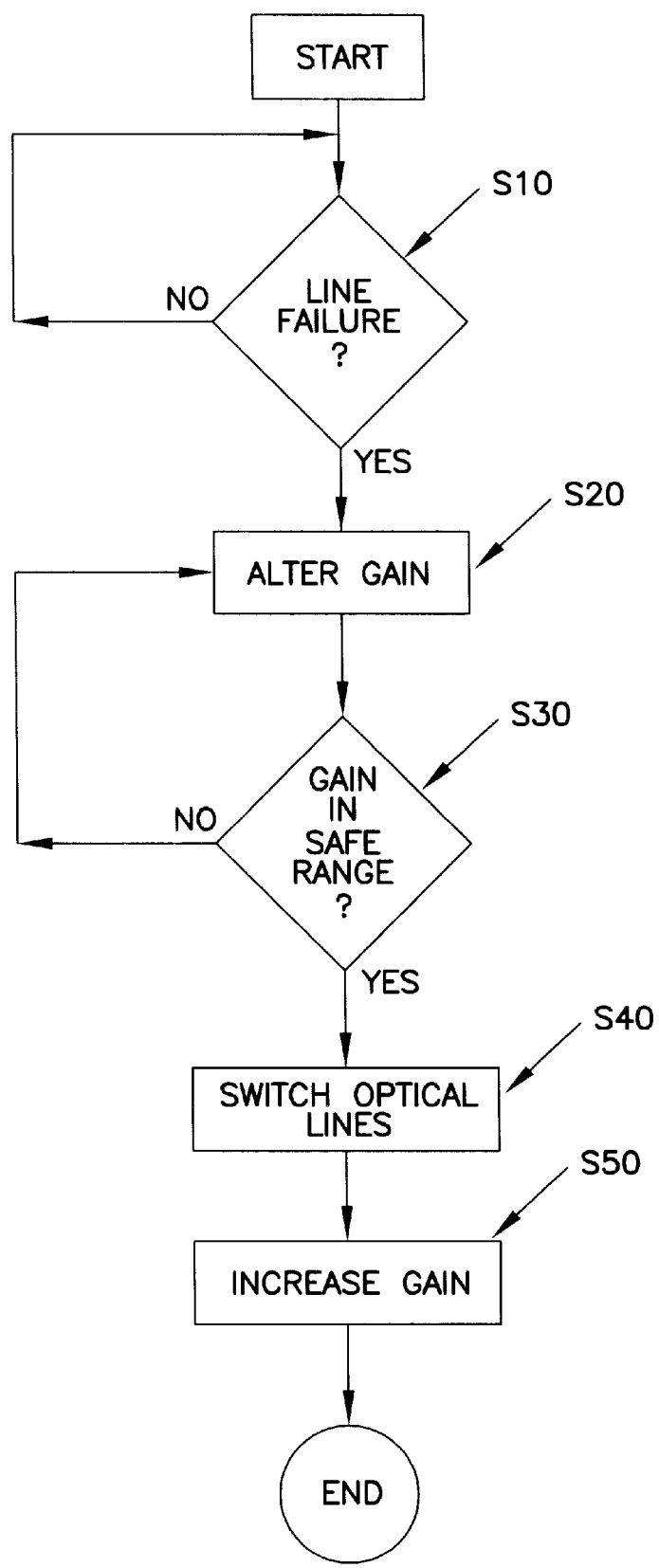
FIG. 3 is a flow chart illustrating acts involved in a first preferred process of reducing a destructive optical surge according to the current invention.

Now referring to FIG. 3, a flow chart illustrates acts involved in a first preferred process of reducing a destructive optical surge according to the current invention. Upon detecting an optical line failure in a step S10, the amplification gain of an optical amplifier is altered in a step S20. The amplification gain is monitored in a step S30 while it is altered in a prescribed manner, and when the amplification gain falls within a predetermined safe amplification gain range, optical lines are switched from a failed optical line to an operational optical line in a step S40. Since the optical line switch takes place after the amplification gain has reached a certain predetermined value, even if there is a temporary optical power increase in an output of the optical amplifier, the optical output level during and after the switch is acceptable and does not cause a harmful effect on an optical system. In order to speed up a recovery period of the optical system after the line switch, in a step S50, the amplification gain is altered towards a normal amplification gain value.

Figure 4:
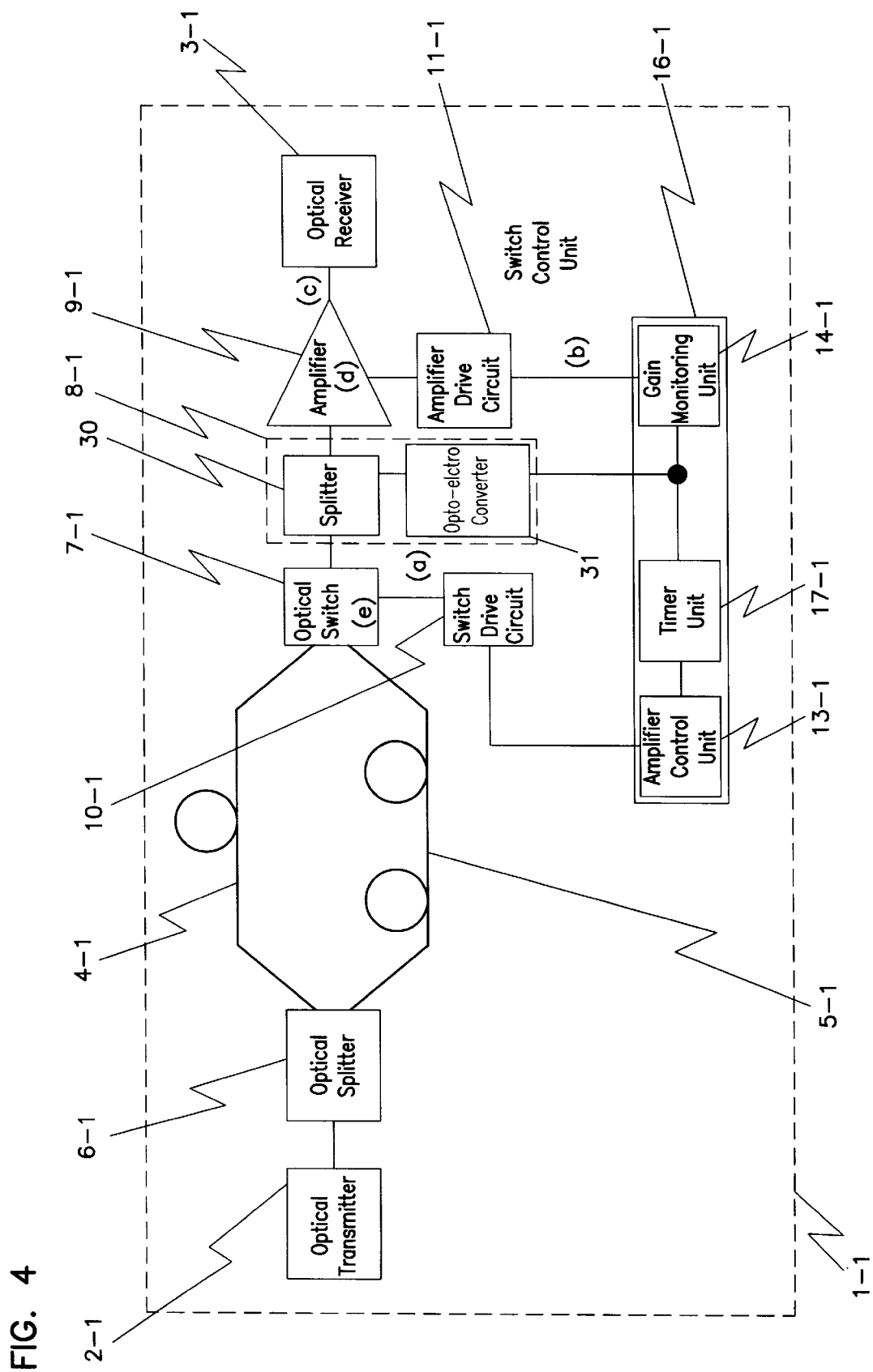
FIG. 4 is a block diagram illustrating a second preferred embodiment of the optical surge reduction apparatus according to the current invention.

FIG. 4 illustrates a second preferred embodiment of the optical surge reduction apparatus 16-1 according to the current invention in an optical transmission system 1—1.

The optical transmission system 1—1 includes an optical transmitter 2-1 for sending an optical signal to an optical splitter 6-1, which splits the optical signal to dual optical lines 4-1 and 5-1 for carrying the optical signal over distance in a duplicate manner. The dual optical lines include a regular line 4-1 for regular transmission and a back-up line 5-1 for emergency transmission when the regular line 4-1 fails. The optical transmission system 1—1 also includes an optical switch 7-1 for switching between the regular line 4-1 and the back-up line 5-1. The optical switch 7-1 is driven by an optical switch drive circuit 10-1. An optical amplifier 9-1 amplifies an output of the optical switch 7-1, which has been attenuated by attenuating factors such as the distance of the optical line and generates an amplified optical signal. An optical amplifier drive circuit 11-1 drives the optical amplifier 9-1. Finally, an optical receiver 3-1 receives the amplified optical signal.

The second preferred embodiment of the optical surge reduction apparatus 16-1 according to the current invention includes an optical switch control unit 13-1 for controlling the switch drive circuit 10-1, an optical amplifier control unit 14-1 for controlling the optical amplifier drive circuit I1-1 as well as a timer unit 17-1 for monitoring an elapsed time amount after a certain trigger signal. The optical surge reduction apparatus 16-1 receives an electrical input signal from the optical power monitoring unit 8-1. The optical power monitoring unit 8-1 is located between the optical switch 7-1 and the optical amplifier 9-1 and monitors the power level of the output optical signal from the optical switch 7-1. The optical power monitoring unit 8-1 includes an optical splitter 30 for splitting the output optical signal from the optical switch 7-1 and an opto-electro converter 31 for converting an optical signal to the electrical input signal for the optical surge reduction apparatus 12-1.

Still referring to FIG. 4, the second preferred embodiment of the optical surge reduction apparatus 16-1 substantially reduces the risk of having undesirable effects due to an optical surge during a line switch operation by controlling the onset of the line switch operation based upon an elapsed time period after initiating an amplification gain change in an optical amplifier. When the optical surge reduction apparatus 16-1 detects an optical power failure based upon the electrical input signal from the optical power monitoring unit 8-1, the optical amplifier control unit 14-1 initiates a change in the amplification gain of the optical amplifier 9-1 via the optical amplifier drive circuit 11-1. Concurrently, the detection of the optical line failure also initiates the onset of the timer unit 17-1 for keeping track of an elapsed time period after the initiation of the amplification gain change.

When the elapsed time amount is within a predetermined safe time range, the timer unit 17-1 sends a switch ready signal to the optical switch control unit 13-1 for initiating the control of the optical switch 7-1 via the switch drive circuit 10-1. The predetermined safe time range is determined for a give optical amplifier, and the predetermined safe time range is defined to be a time range during which the switching of the optical lines does not cause a detrimental effect due to an optical surge. Because the above described switching operation of the optical switch 7-1 does not take place until the elapsed time is within the predetermined safe time range, the likelihood of having an undesirable optical surge is substantially reduced.

Figure 5:
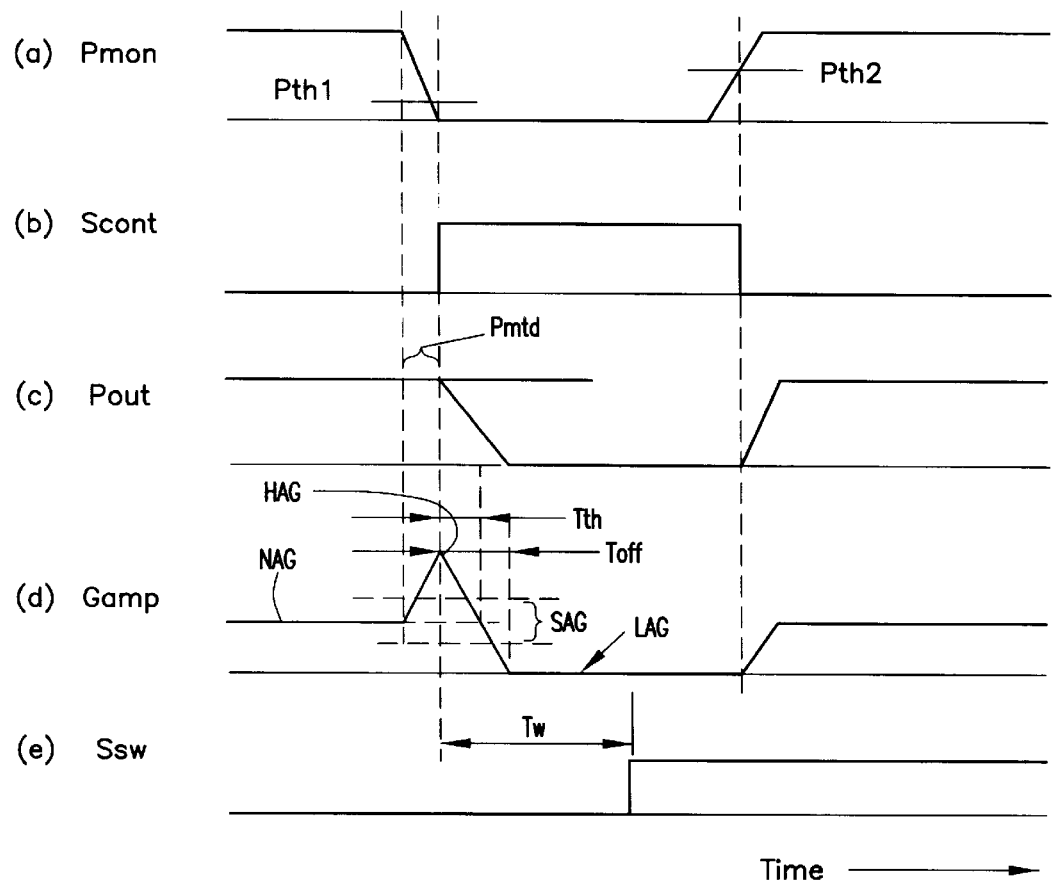
FIG. 5 is a series of timing charts illustrating the dependency of certain components in relation to the second preferred embodiment of the optical surge reduction apparatus according to the current invention.

Now referring to FIG. 5, timing charts illustrate the dependency of certain components of the optical transmission system and the second preferred embodiment of the optical surge reduction apparatus 16-1 according to the current invention. A timing chart (a) delineates that the optical power monitoring unit 8-1 of FIG. 4 monitors the optical power Pmon. While the optical power is above a predetermined threshold value Pth1, the amplification gain of the optical amplifier 9-1 of FIG. 4 remains at a predetermined normal amplification gain value NAG. However, as the optical power signal weakens towards the predetermined threshold value Pth1, the optical amplifier attempts to maintain its optical power output during a time period Pmtd as shown in a timing chart (c) Pout by increasing the gain towards a high amplification gain value HAG in a time chart (d) Gamp.

Still referring to FIG. 5, in response to the detection of an optical line failure indicated by the optical power finally reaching at or below the predetermined threshold value Pth1, as shown in a timing chart Pmon (a), the optical amplifier control unit 14-1 of the optical surge reduction apparatus 12-1 generates a drive signal as shown in a timing chart (b) Scont shows to alter the amplification gain of the optical amplifier 9-1 via the optical amplifier drive circuit 11-1. One way to lower the gain is to turn off a source of an excitation light in the optical amplifier 9-1. As the drive signal is generated, the timer unit 17-1 is initiated to keep track of time. The timing chart (d) Gamp shows that the gain of the amplifier 9-1 is reduced towards a predetermined low amplification gain value LAG. As a result of the amplification gain reduction, as shown in the timing chart (c) Pout, the optical amplifier 9-1 reduces its output signal. A time period during which the amplification gain value falls within a predetermined safe amplification gain range SAG is defined as a first time period Tth as shown in the timing chart (d). Within the first time period Tth, even if an optical surge is caused, the optical system experiences no detrimental or harmful effects. Similarly, another time period during which the amplification gain value is reduced from the high amplification gain value HAG to the low amplification gain value LAG is defined as a second time period Toff. After the second time period Toff, a margin of safety is added to reduce a risk of having a detrimental optical surge. In general, the second time period Toff is longer than the first time period Tth. The optical switch control unit 13-1 of the optical surge reduction apparatus 16-1 generates a switch control signal after a third time period Tw as shown in a timing chart (e) Ssw. The third time period Tw is longer than the second time period Toff to allow an extra margin of safety for substantially eliminating an optical surge during the switch operation. In response to the switch control signal, the switch drive circuit 10-1 causes the optical switch 7-1 to initiate a switch of the failed optical line to another operational one without experiencing detrimental effects of an optical surge.

One way to lower the amplification gain is to shut off a source of an excitation light in the optical amplifier 9-1 of FIG. 1. The amplification gain reduction time is an amount of time to lower an amplification gain, and it depends upon material used in an optical amplifier. For example, using an optical amplifier with erbium-doped optical fibers, the amplification gain reduction time depends upon the life of the excited ions at $I_{13/2}$ as well as the amplification gain prior to the shut off of the excitation source. It takes approximately 10 milliseconds for the number of ions at $I_{13/2}$ to reach 1/e. In other words, an optical surge is likely to occur when an optical switch completes a switch operation within a time period that is shorter than the above described amplification gain reduction time. Thus, for the erbium-based optical amplifier, the above third time period Tw does not have to be much longer than 10 milliseconds, and the above first time period Tth is less than 10 milliseconds and preferably about 1 millisecond.

An alternative embodiment of the optical surge reduction apparatus according to the current invention includes both a switch control unit and an amplifier control unit without a timer unit or a gain monitoring unit. However, the alternative embodiment calls for an optical switch which consumes at least an amount of time equal to Tth to switch optical lines after the onset of the switch operation. In other words, the switch is sufficiently slow in completing the optical line change so that the amplification gain is sufficiently reduced after the onset of a switching operation. For example, the above described slow switches include a mechanical type of optical switches. Other alternative embodiments include a separate optical power monitoring unit which is connected to each of the optical lines. Upon detecting a failed line, the optical power monitoring unit generates a trigger signal for an optical switch.

Figure 6:
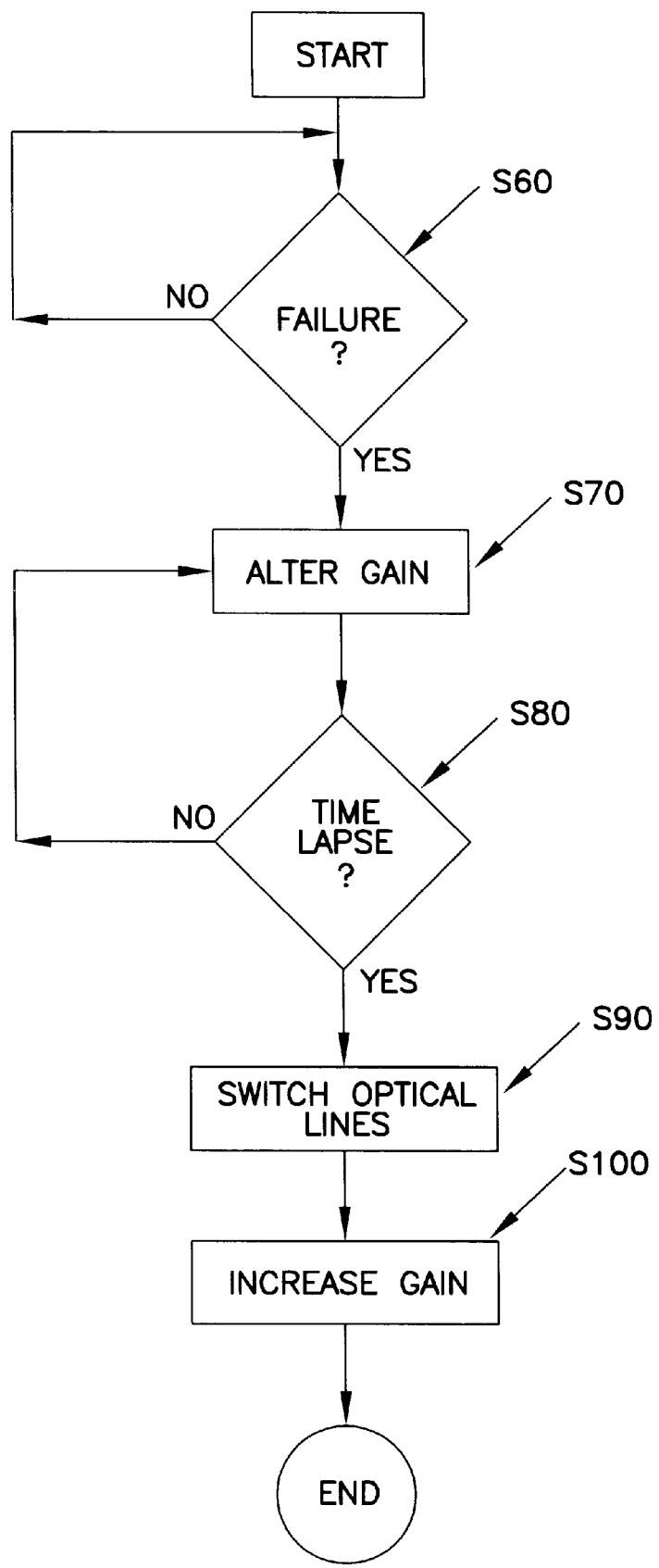
FIG. 6 is a flow chart illustrating acts involved in a second preferred process of reducing a destructive optical surge according to the current invention.

Now referring to FIG. 6, a flow chart illustrates acts involved in a second preferred process of reducing a destructive optical surge according to the current invention.

Upon detecting an optical line failure in a step S60, the amplification gain of an optical amplifier is altered in a step S70. An amount of time after the onset of the gain change in the step S70 is monitored in a step S80, and when the elapsed time falls within a predetermined safe time range, optical lines are switched from a failed optical line to an operational optical line in a step S90. Since the optical line switch takes place after the elapsed time has reached a certain predetermined range, even if there is an optical power increase in an output of the optical amplifier, the optical output level during and after the switch is acceptable and does not cause a harmful effect on an optical system. In order to speed up a recovery phase of the optical system after the switch, in a step S100, the amplification gain is increased towards a normal amplification gain value.

Figure 7:
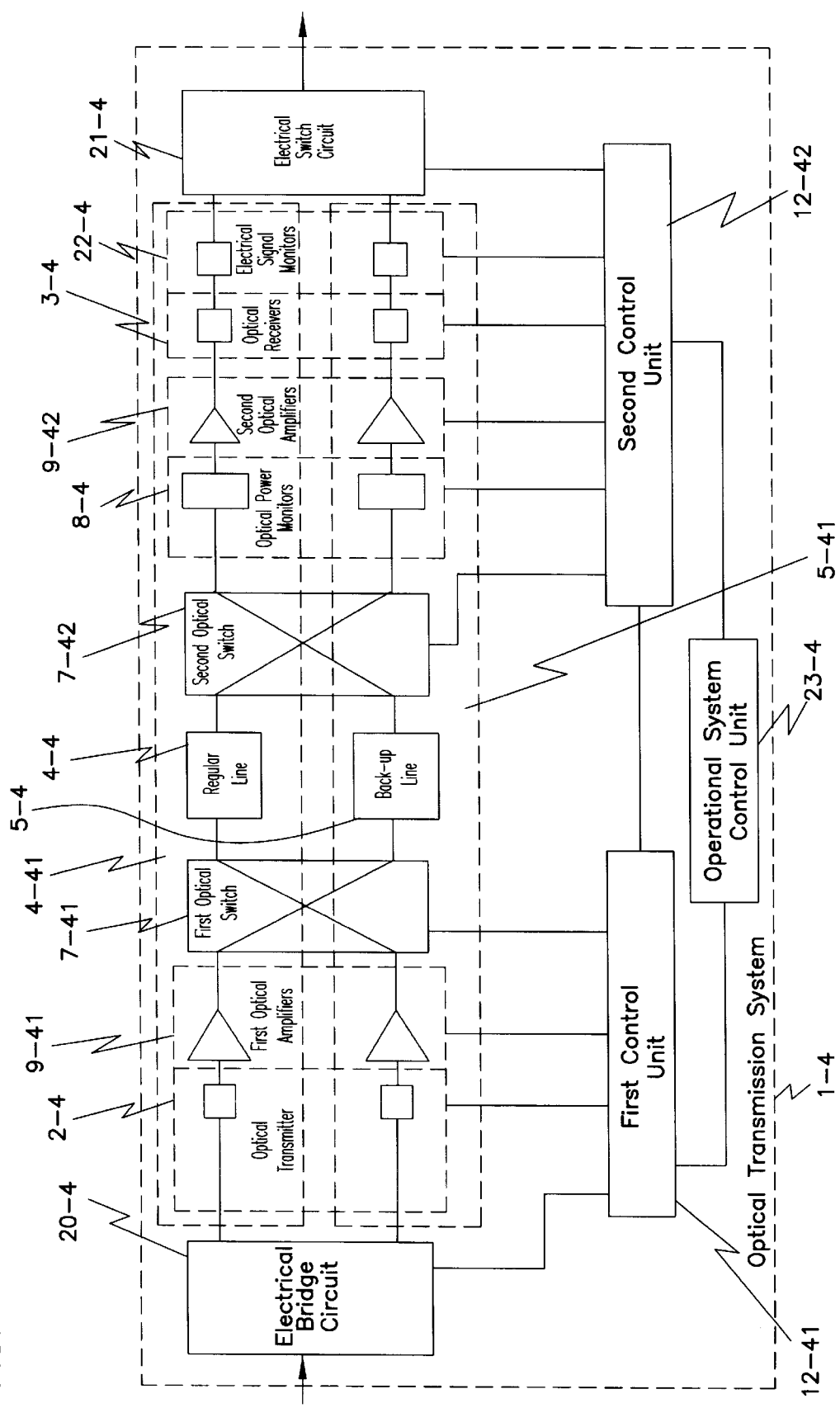
FIG. 7 is a block diagram illustrating a third preferred embodiment of the optical surge reduction apparatus according to the current invention.

FIG. 7 illustrates a third preferred embodiment of the optical surge reduction apparatus 12-41, 12-42 and 23-4 according to the current invention in an optical transmission system 1-4. The optical transmission system 1-4 includes dual line sub-systems including a regular sub-system 4-41 and a back-up sub-system 5-41 for maintaining duplicate transmission. Upon detecting a failure in the regular sub-system 4-41, the optical transmission system 1-4 utilizes the back-up sub-system 5-41. The optical transmission system 1-4 further includes an electrical bridge circuit 20-4, a pair of optical transmitters 2-4 for transmitting an optical signal to a pair of first optical amplifiers 9-41, dual optical lines 4—4 and 5-4 for carrying the optical signal over distance in a duplicate manner. The dual optical lines include a regular line 4—4 for regular transmission and a back-up line 5-4 for emergency transmission when the regular line 4—4 fails. The optical transmission system 1-4 also includes a first optical switch 7-41 for taking two optical lines as inputs and switching between the regular line 4—4 and the back-up line 5-4 as outputs.

Still referring to FIG. 7, a second optical switch 7-42 receives the regular line 4—4 and the back-up line 5-4 and switches between these optical lines. The outputs of the second optical switch 7-42 are connected to a pair of optical power monitors 8-4 for monitoring the intensity of the optical signal in each optical line and then connected to a pair of second optical amplifiers 9-42. A pair of optical receivers 3-4 receives a pair of the amplified optical signals and converts them to respective electrical signals. After a pair of electrical signal monitors 22-4 monitors the strength of the electrical signals, an electrical switch circuit 21-4 further processes the electrical signals. The third preferred embodiment of the optical surge reduction apparatus includes a first control unit 12-41 for controlling the electrical bridge circuit 20-4, the optical transmitters 2-4, the first optical amplifiers 9-41 and the first optical switch 7-41 as well as a second control unit 12-42 for controlling the second optical switch 7-42, the optical power monitors 8-4, the second optical amplifiers 9-42, the optical receivers 3-4, the electrical signal monitors 22-4 and the electrical switch circuit 21-4. Finally, an operational system control unit 23-4 ultimately controls the first control unit 12-41 and the second control unit 12-42. As described above, in addition to switching between the entire sub-systems 4-41 and 5-41, the first and second optical switches 7-41 and 7-42 enable the optical transmission system 1-4 to independently select an optical line as well as devices associated with the selected optical line. This independent switching or selection allows a responsive and flexible recovery by combining components for various or multiple failures in the optical transmission system 1-4. For example, while an optical receiver is not operational in the back-up sub-system 5-41, if a problem develops in an optical line in the regular sub-system 4-41, the operational system control unit 23-4 along with the first and second control units 12-41 and 12-42 operates on the first and second optical switches 7-41 and 7-42 in order to isolate the change of the optical line from the regular sub-system 4-41 to the back-up sub-system 5-41. The implementation of the first and second control units 12-41 and 12-42 includes the above described first and second preferred embodiments of the optical surge reduction apparatus according to the current invention, and the optical surge is substantially reduced during the switch operations of the first and second optical switches 7-41 and 7-42. The above described advantages of the current invention are also applicable to a situation where an optical amplifier is newly installed while the optical transmission system is operating for data transmission. Similarly, the above described advantages of the current invention are applicable to the wavelength division multiplexing transmission in an optical line.

Figure 8:
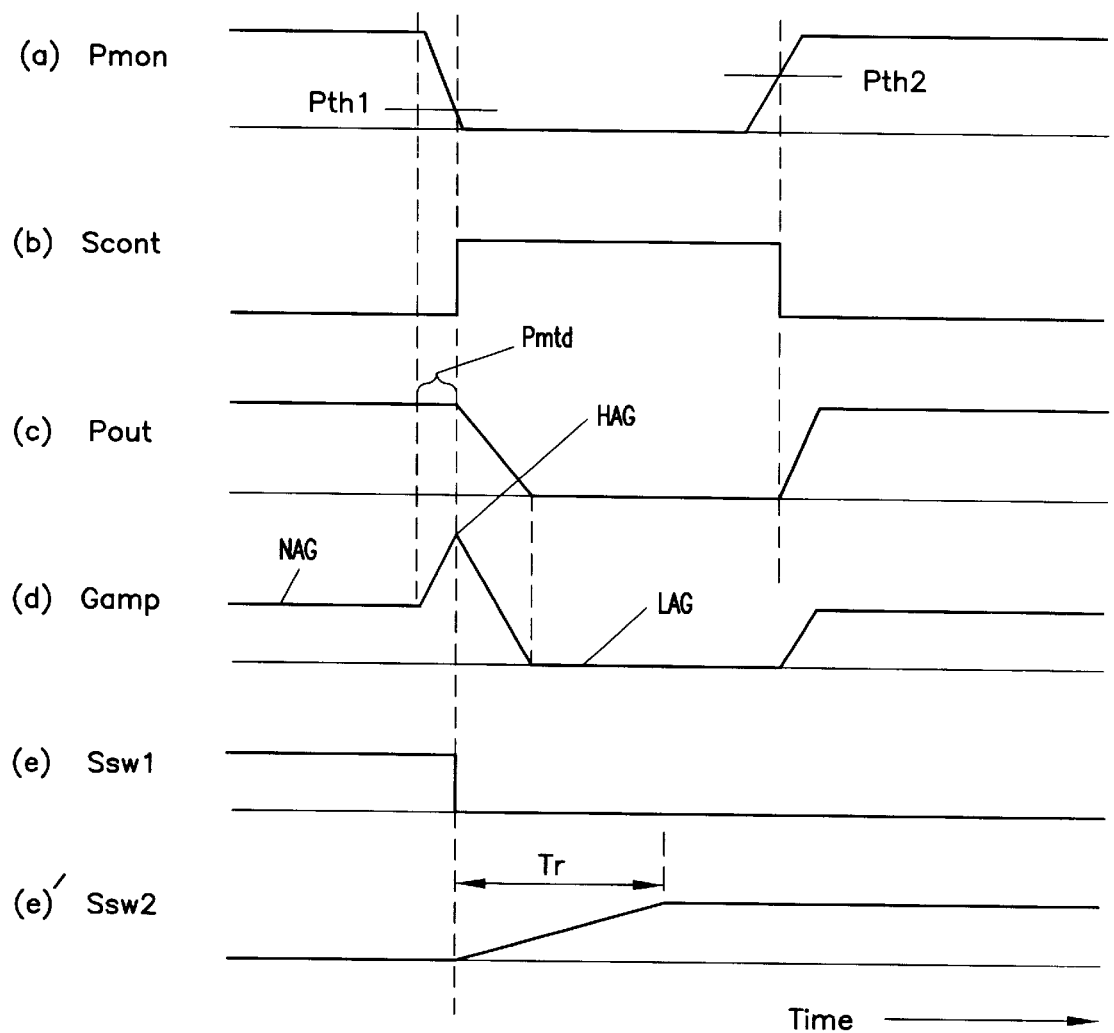
FIG. 8 is a series of timing charts illustrating the dependency of certain components in relation to the third preferred embodiment of the optical surge reduction apparatus according to the current invention.

Now referring to FIG. 8, timing charts illustrate the dependency of certain components of the optical transmission system and the third preferred embodiment of the optical surge reduction apparatus 12-41 and 12-42 according to the current invention. A timing chart (a) delineates that the optical power monitoring unit 8-4 of FIG. 7 monitors the optical power Pmon. While the optical power is above a predetermined threshold value Pth1, the gain of one of the optical amplifiers 9-42 of FIG. 7 remains at a predetermined normal amplification gain value NAG. However, as the optical power weakens towards the predetermined threshold value Pth1, the optical amplifier 9-42 attempts to maintain its optical power output during a time period Pmtd as shown in a timing chart (c) Pout by compensating the amplification gain towards a high amplification gain value HAG in a time chart (d) Gamp.

Still referring to FIG. 8, in response to the detection of an optical line failure indicated by the optical power finally reaching at or below the predetermined threshold value Pth1, the first control unit 12-41 generates a drive signal to alter the gain of the optical amplifier 9-42 as shown in a timing chart (b) Scont. One way to lower the gain is to shut off a source of an excitation light in the optical amplifier 9-42. The timing chart (d) Gamp shows that the amplification gain of the optical amplifier 9-42 is reduced towards a predetermined low amplification gain value LAG. As a result of the gain reduction, as shown in the timing chart (c) Pout, the optical amplifier 9-42 reduces its output signal. At the onset when the amplification gain reaches the high amplification gain value HAG as shown in the time chart (d) Gamp, the first optical switch 7-41 initiates and completes a switch operation as shown in a timing chart (e) Ssw1. On the other hand, the second optical switch 7-42 initiates the switch operation at the same time, but does not immediately complete the switch operation until a time period Tr elapses. This delay substantially reduces the risk of detrimental effects of an optical surge caused by an optical amplifier. In order to control an amount of the delay, implementations of the optical switch 7-42 include a wave guide optical switch with an electro-optical effect and a wave guide optical switch with a thermo-optical effect, and the time period Tr is controlled respectively by voltage and temperature.

Figure 9A:
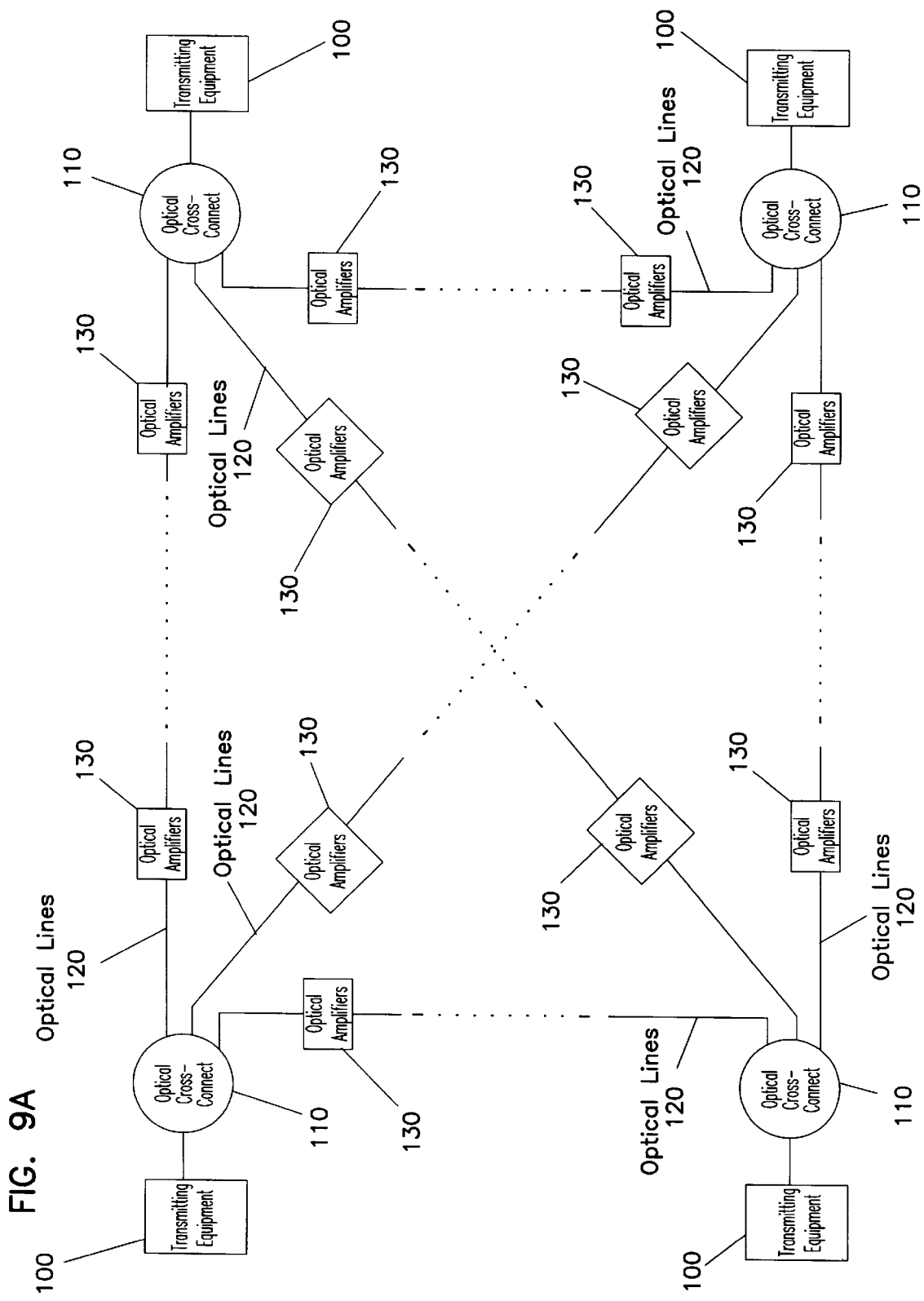
FIGS. 9A and 9B illustrate two exemplary network configurations where the current invention can be applied to reduce an optical surge.
Figure 9B:
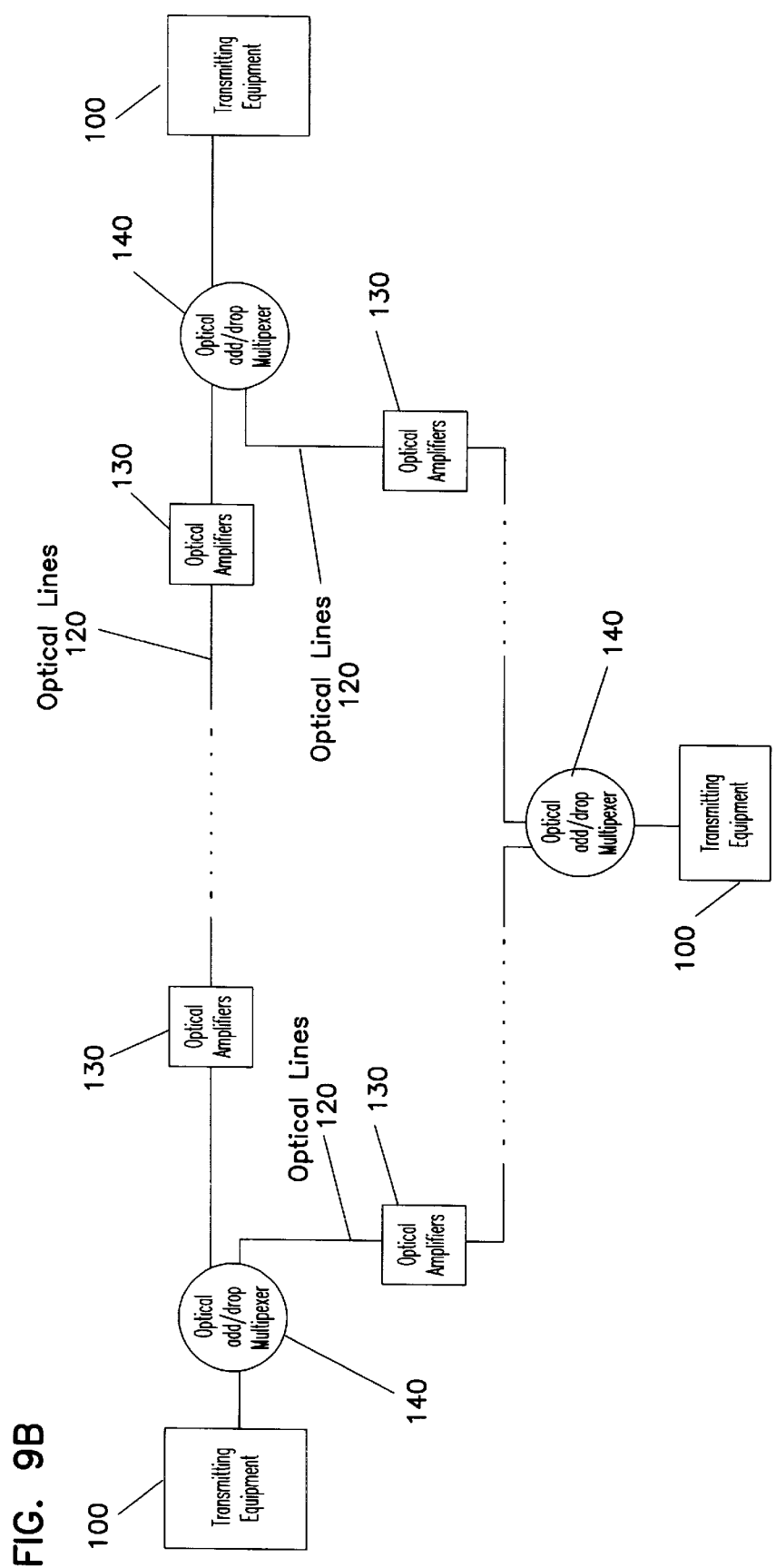

Referring to FIGS. 9A and 9B, optical data communication systems are illustrated in two exemplary network configurations. Referring to FIG. 9A, a mesh configuration includes four nodes, and each of the nodes further includes a line transmitting equipment 100 and an optical cross-connect 110. These four nodes are interconnected by optical lines 120, and each of the optical lines 120 is equipped with at least two optical amplifiers 130. The optical cross-connect is an optical switch for selecting an optical line as a route for transmitting an optical signal. At each node, as optical lines are switched from one optical line to another, either of the above described first and second preferred processes according to the current invention is applied to substantially eliminate detrimental effects of an optical surge.

Now referring to FIG. 9B, a ring configuration includes three nodes, and each of the nodes further includes a line transmitting equipment 100 and an optical add/drop multiplexer 140. These three nodes are connected in a ring configuration by optical lines 120, and each of the optical lines 120 is equipped with at least one optical amplifier 130. The optical multiplexer is an optical switch for selecting an optical line as a route for transmitting an optical signal. At each node, as optical lines are switched from one optical line to another, either of the above described first and second preferred processes according to the current invention is applied to substantially eliminate detrimental effects of an optical surge.

Figure 10:
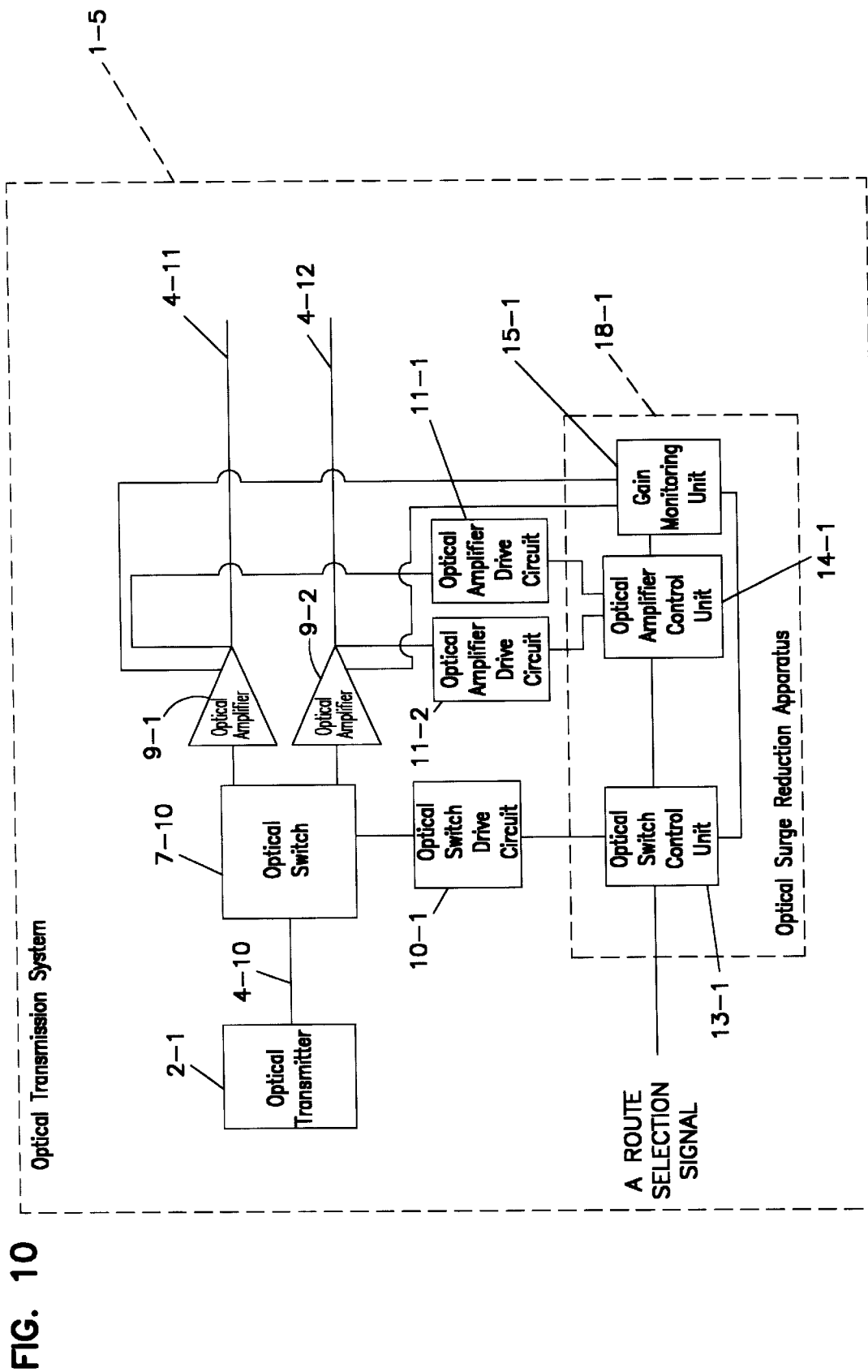
FIG. 10 is a block diagram illustrating a fourth preferred embodiment of the optical surge reduction apparatus according to the current invention.

FIG. 10 illustrates a fourth preferred embodiment of the optical surge reduction apparatus 18-1 according to the current invention in an optical transmission system 1-5. The optical transmission system 1-5 includes an optical transmitter 2-1 for sending an optical signal to an optical switch 7-10 via an optical line 4-10. The optical switch 7-10 receives the optical signal and selects one of optical lines 4-11 and 4-12 as a route for further transmitting the optical signal to a desired destination. The optical switch 7-10 is driven by an optical switch drive circuit 10-1. A pair of optical amplifiers 9-1 and 9-2 is respectively connected to the optical lines 4-11 and 4-12 and amplifies an output of the optical switch 7-10. A pair of optical amplifier drive circuits 11-1 and 11-2 respectively drives the optical amplifiers 9-1 and 9-2.

Still referring to FIG. 10, the fourth preferred embodiment of the optical surge reduction apparatus 18-1 according to the current invention includes an optical switch control unit 13-1 for controlling the switch drive circuit 10-1, an optical amplifier control unit 14-1 for controlling the optical amplifier drive circuits 11-1 and 11-2 as well as a gain monitoring unit 15-1 for monitoring an amplification gain value of the optical amplifiers 91 and 9-2. When the optical surge reduction apparatus 18-1 receives a route selection signal, the optical switch control unit 13-1 determines whether or not the selected route is already in a predetermined active condition. If the selected optical line is not in the active condition, the optical switch control unit 13-1 outputs an amplifier alteration signal to the optical amplifier control unit 14-1.

Assuming that the optical line 4-11 is now in a predetermined active condition and that the route selection signal indicates a route change to the optical line 4-12 that is not in the active condition, the optical amplifier control unit 14-1 alters the amplification gain value of the optical amplifiers 9-1 and 9-2 respectively via the optical amplifier drive circuits 11-1 and 11-2. In this example, the amplification gain value of the optical amplifier 9-1 is reduced while that of the optical amplifier 9-2 is increased towards a predetermined safe amplification gain range. Upon the onset of the amplification gain alteration, the gain monitoring unit 15-1 starts monitoring the amplification gain value of the optical amplifier 9-2 and determines whether or not the amplification gain value is within a predetermined safe amplification gain range. When the amplification gain value is within the predetermined safe amplification gain range, the gain monitoring unit 15-1 sends a switch ready signal to the optical switch control unit 13-1 for initiating a switch operation in the optical switch 7-10 via the switch drive circuit 10-1. Because the above described switching operation of the optical switch 7-10 does not take place until the amplification gain value is within the predetermined safe amplification gain range, undesirable optical surge is substantially reduced.

Figure 11:
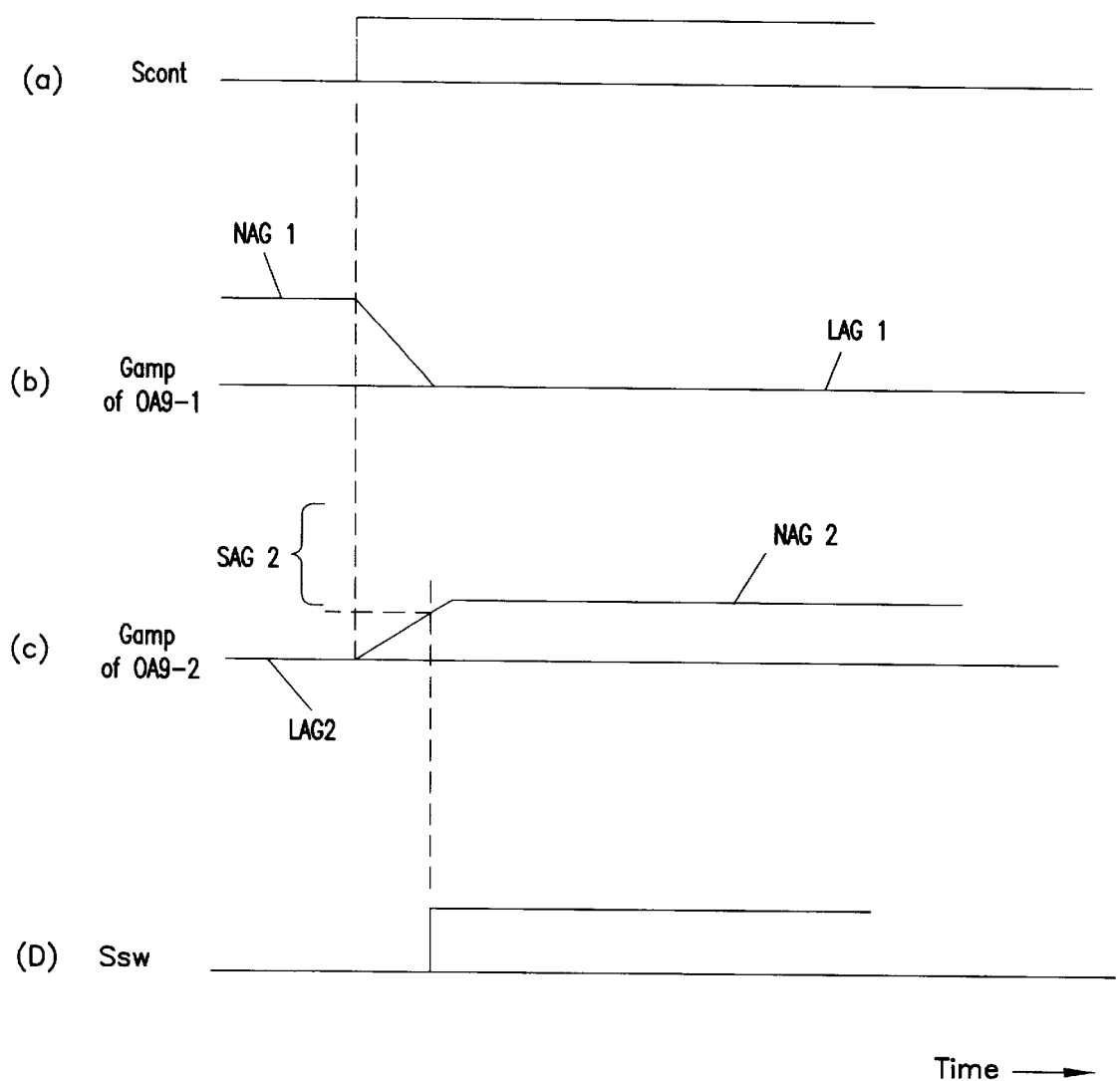
FIG. 11 is a series of timing charts illustrating the dependency of certain components in relation to the fourth preferred embodiment of the optical surge reduction apparatus according to the current invention.

Now referring to FIG. 11, timing charts illustrate the dependency of certain components of the optical transmission system and the fourth preferred embodiment of the optical surge reduction apparatus 18-1 according to the current invention. In response to a route selection signal, a timing chart (a) Scont shows that the optical amplifier control unit 14-1 generates a drive signal to alter the amplification gain of the optical amplifier 9-1. A timing chart (b) Gamp shows that the amplification gain of the optical amplifier 9-1 is reduced from a predetermined normal operation amplification gain value NAG1 to a predetermined low amplification gain value LAG1. A timing chart (c) Gamp shows that the amplification gain of the optical amplifier 9-2 is initiated to increase, upon the onset of the drive signal from the optical amplifier control unit 14-1, from a predetermined low operation amplification gain value LAG2 towards a predetermined normal amplification gain value NAG2 which is included in a safe amplification gain range SAG2. At the onset when the amplification gain of the optical amplifier 9-2 reaches the safe amplification gain range SAG2 as shown in the time chart (c) Gamp, the optical switch 7-10 initiates and completes a switch operation as shown in a timing chart (d) Ssw. In the above example, the predetermined low amplification gain LAG2 can be any value below NAG2, and the optical amplifier can be maintained in a certain "warm" condition rather than starting from a completely "cold" inactive condition.

Figure 12:
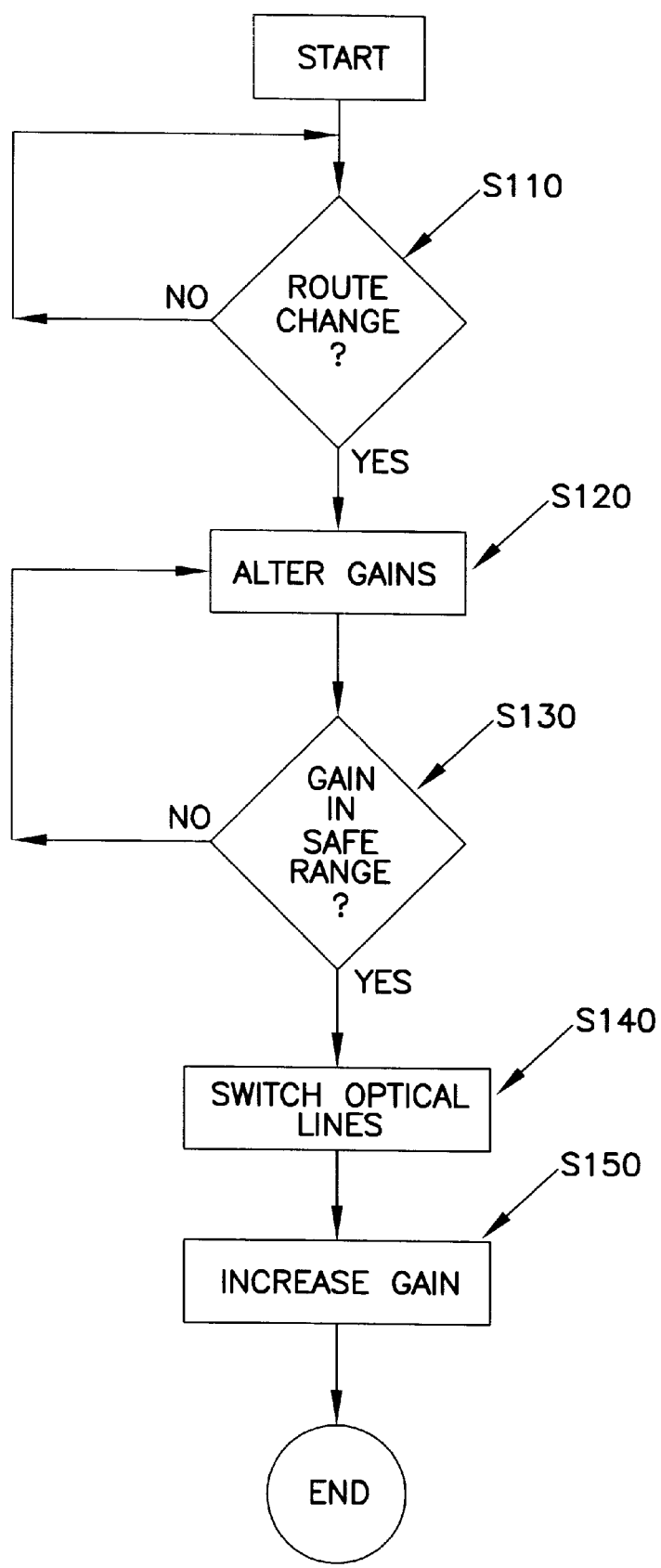
FIG. 12 is a flow chart illustrating acts involved in a third preferred process of reducing a destructive optical surge according to the current invention.

Now referring to FIG. 12, a flow chart illustrates acts involved in a third preferred process of reducing a destructive optical surge according to the current invention. Upon detecting an optical line route change request in a step S110, the amplification gain of optical amplifiers is altered in a step S120. In the above example as described with respect to FIG. 11, the amplification gain of the currently active optical amplifier 9-1 is reduced while that of the currently inactive optical amplifier 9-2 is increased. The amplification gain of the optical amplifier 9-2 is monitored in a step S130 while it is altered in a prescribed manner, and when the amplification gain falls within a predetermined safe amplification gain range, optical lines are switched from a current optical line to a selected optical line in a step S140. Since the optical line switch takes place after the amplification gain has reached a certain predetermined safe value, even if there is an optical power increase in an output of the optical amplifier, the optical output level during and after the switch is acceptable and does not cause a harmful effect on an optical data transmission system. In order to speed up a recovery phase of the optical system after the switch, in a step S150, the amplification gain is further altered towards a normal amplification gain value.

Figure 13:
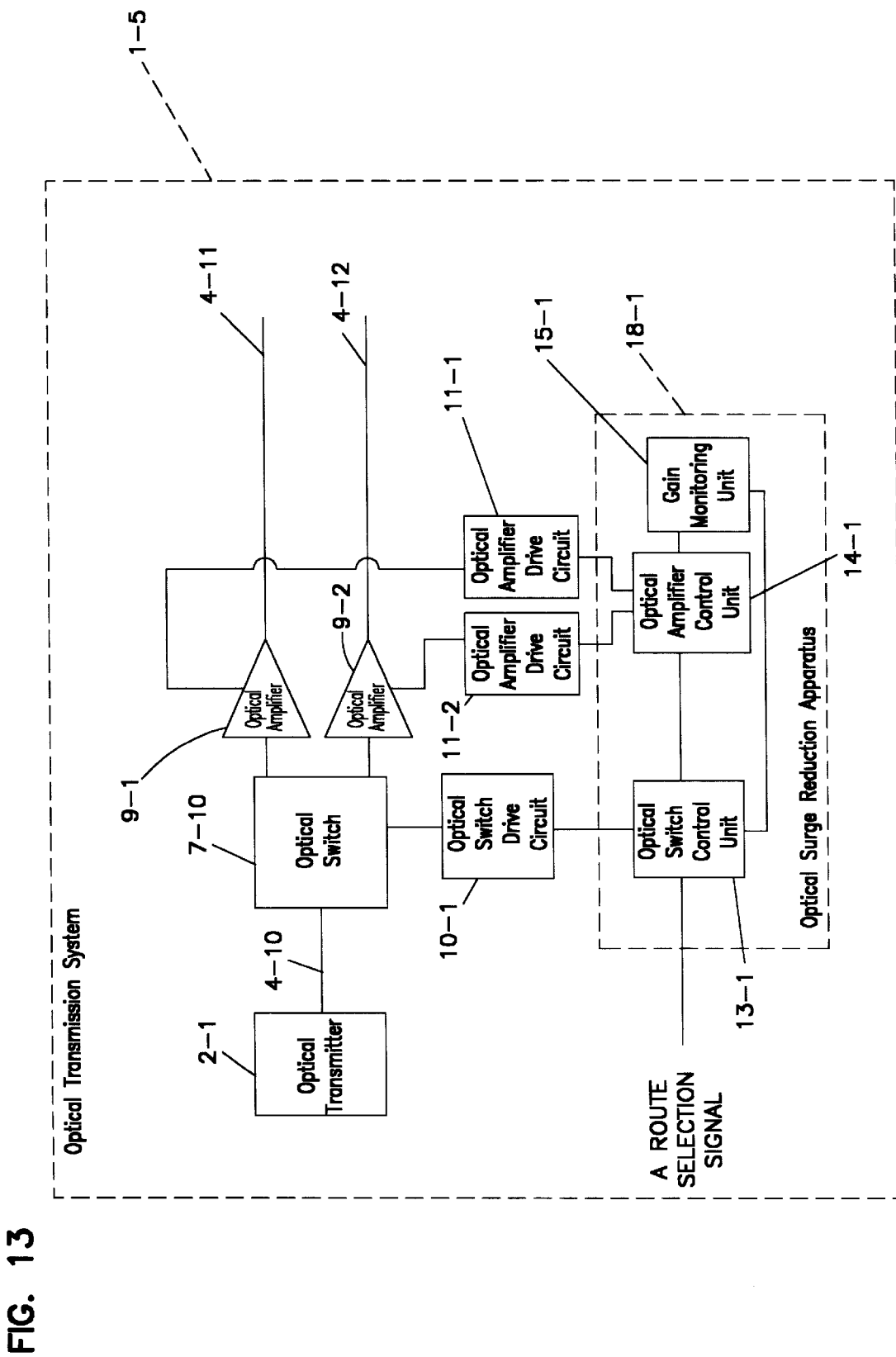
FIG. 13 is a block diagram illustrating a fifth preferred embodiment of the optical surge reduction apparatus according to the current invention.

FIG. 13 illustrates a fifth preferred embodiment of the optical surge reduction apparatus 19-1 according to the current invention in an optical transmission system 1-6.

The optical transmission system 1-6 includes an optical transmitter 2-1 for sending an optical signal to an optical switch 7-10 via an optical line 4-10. The optical switch 7-10 receives the optical signal and selects one of optical lines 4-11 and 4-12 as a route for further transmitting the optical signal to a desired destination. The optical switch 7-10 is driven by an optical switch drive circuit 10-1. A pair of optical amplifiers 9-1 and 9-2 is respectively connected to the optical lines 4-11 and 4-12 and amplifies an output of the optical switch 7-10. A pair of optical amplifier drive circuits 11-1 and 11-2 respectively drives the optical amplifiers 9-1 and 9-2.

Still referring to FIG. 13, the fifth preferred embodiment of the optical surge reduction apparatus 19-1 according to the current invention includes an optical switch control unit 13-1 for controlling the switch drive circuit 10-1, an optical amplifier control unit 14-1 for controlling the optical amplifier drive circuits 11-1 and 11-2 as well as a timer unit 20-1 for monitoring an elapsed time period. When the optical surge reduction apparatus 19-1 receives a route selection signal, the optical switch control unit 13-1 determines whether or not the selected route is already in a predetermined active condition. If the selected optical line is not in the active condition, the optical switch control unit 1-31 outputs an amplifier alteration signal to the optical amplifier control unit 14-1 as well as to the timer unit 20-1.

Assuming that the optical line 4-11 is now in a predetermined active condition and that the route selection signal indicates a route change to the optical line 4-12 that is not in the active condition, the optical amplifier control unit 14-1 alters the amplification gain value of the optical amplifiers 9-1 and 9-2 respectively via the optical amplifier drive circuits 11-1 and 11-2. In this example, the amplification gain value of the optical amplifier 9-1 is reduced while that of the optical amplifier 9-2 is increased towards a predetermined safe gain range. Upon the onset of the amplification gain alteration, the timer unit 20-1 starts tracking an amount of elapsed time and determines whether or not the elapsed time has reached a predetermined safe time. When the elapsed time is within the predetermined safe time range, the timer unit 20-1 sends a switch ready signal to the optical switch control unit 13-1 for initiating a switch operation in the optical switch 7-10 via the switch drive circuit 10-1. Because the above described switching operation of the optical switch 7-10 does not take place until the elapsed time is within the predetermined safe time range, undesirable effects of an optical surge are substantially reduced.

Figure 14:
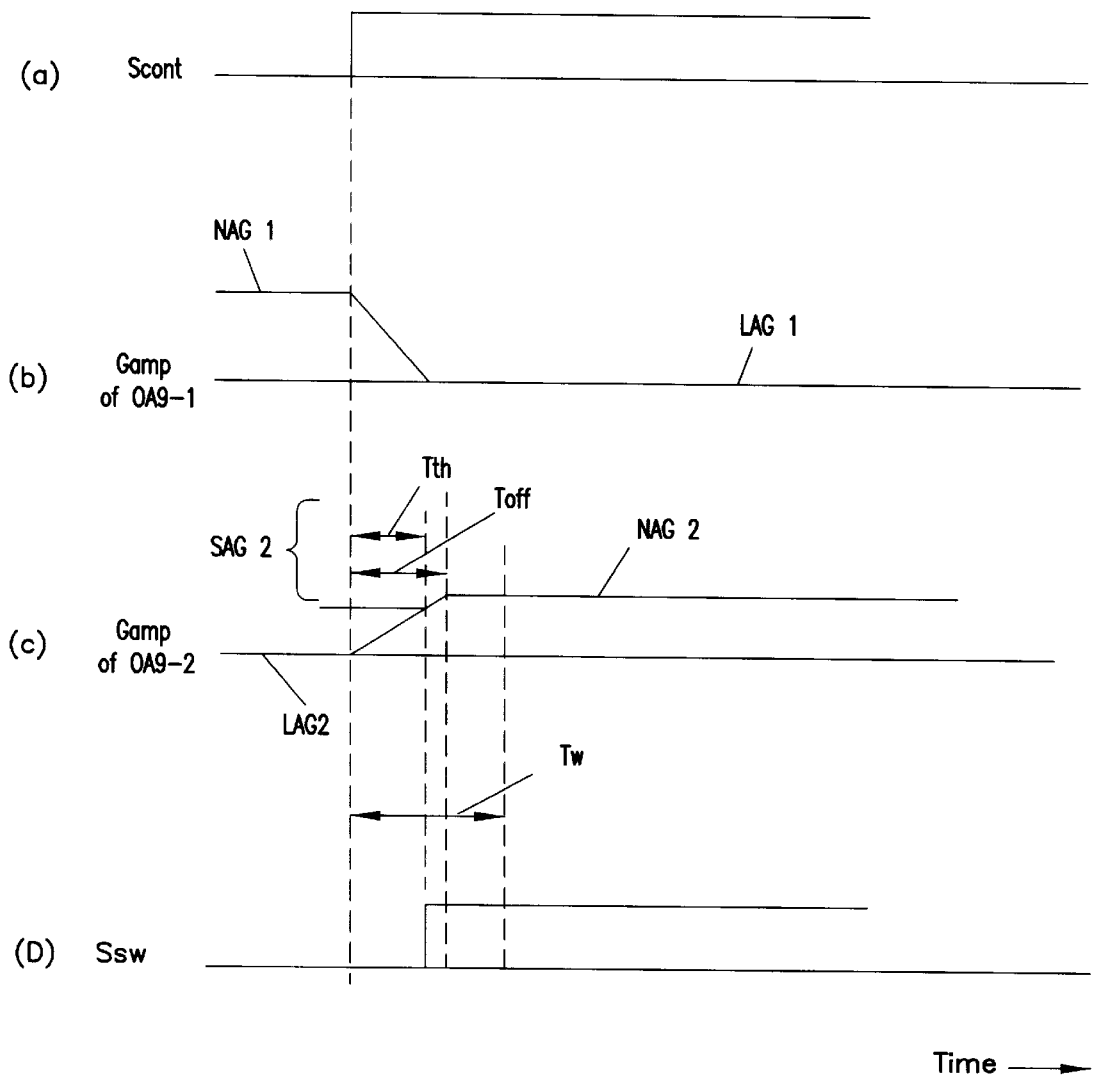
FIG. 14 is a series of timing charts illustrating the dependency of certain components in relation to the fifth preferred embodiment of the optical surge reduction apparatus according to the current invention.

Now referring to FIG. 14, timing charts illustrate the dependency of certain components of the optical transmission system and the fifth preferred embodiment of the optical surge reduction apparatus 19-1 according to the current invention. In response to a route selection signal, a timing chart (a) Scont shows that the optical amplifier control unit 14-1 generates a drive signal to alter the amplification gain of the optical amplifiers 9-1. A timing chart (b) Gamp shows that the amplification gain of the optical amplifier 9-1 is reduced from a predetermined normal operation amplification gain value NAG1 to a predetermined low amplification gain value LAG1. A timing chart (c) Gamp shows that the amplification gain of the optical amplifier 9-2 is initiated to increase, upon the onset of the drive signal from the optical amplifier control unit 14-1, from a predetermined low operation amplification gain value LAG2 towards a predetermined normal amplification gain value NAG2 which is included in a safe amplification gain range SAG2.

Still referring to FIG. 14, a time period during which the amplification gain value falls within a predetermined safe amplification gain range SAG2 is defined as a first time period Tth as shown in the timing chart (c). Within the first time period Tth, even if an optical surge is caused, the optical system experiences no detrimental or harmful effects.

Similarly, another time period during which the amplification gain value is increased from the low amplification gain value LAG2 to the normal amplification gain value NAG2 is defined as a second time period Toff. After the second time period Toff, a margin of safety is added to reduce a risk of having a detrimental optical surge. In general, the second time period Toff is longer than the first time period Tth. The optical switch control unit 13-1 of the optical surge reduction apparatus 19-1 generates a switch control signal after a third time period Tw as shown in a timing chart (d) Ssw. The third time period Tw is longer than the second time period Toff to allow an extra margin of safety for substantially eliminating an optical surge during the switch operation. After the elapsed time is equal to or longer than a first time period Tth as shown in the time chart (c) Gamp, the optical switch 7-initiates and completes a switch operation. In the above example, the predetermined low amplification gain LAG2 can be any value below NAG2, and the optical amplifier can be maintained in a certain "warm" condition rather than starting from a completely "cold" inactive condition.

Figure 15:
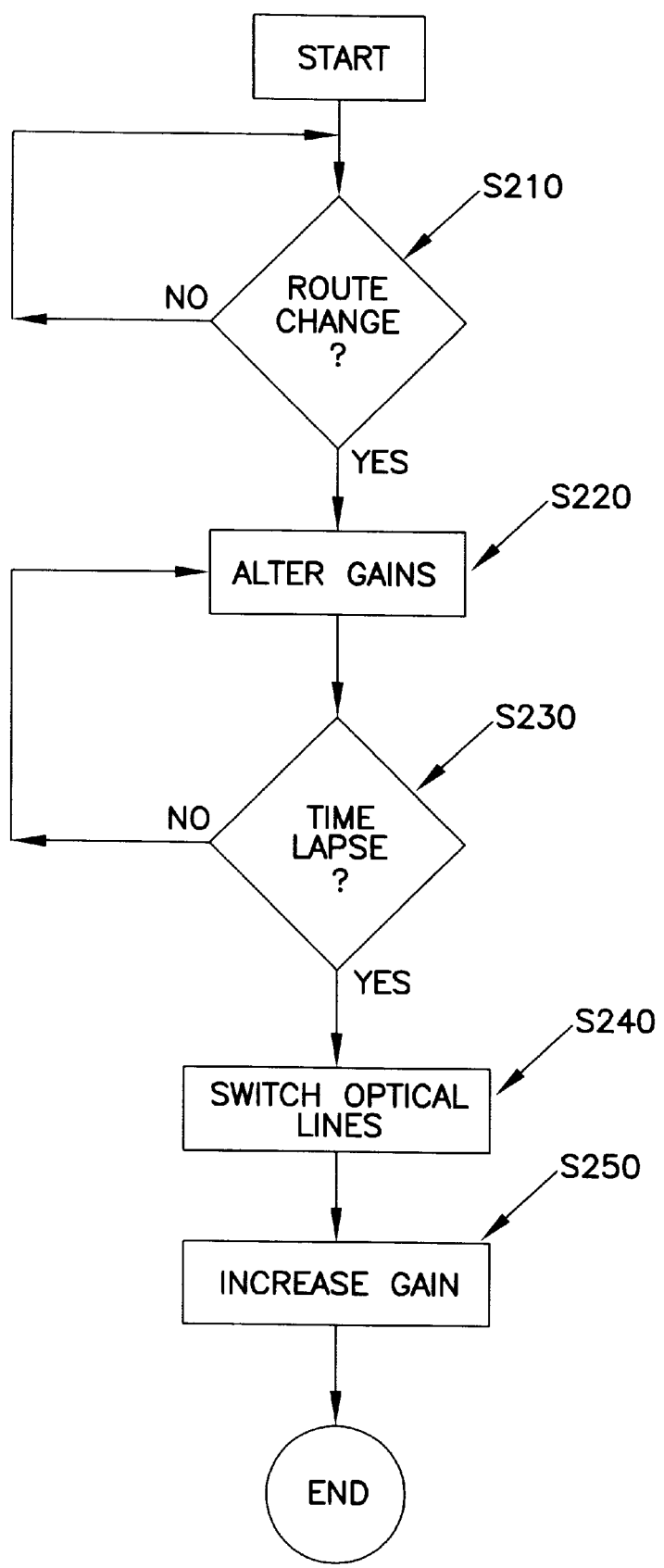
FIG. 15 is a flow chart illustrating acts involved in a third preferred process of reducing a destructive optical surge according to the current invention.

Now referring to FIG. 15, a flow chart illustrates acts involved in a third preferred process of reducing a destructive optical surge according to the current invention. Upon detecting an optical line route change request in a step S210, the amplification gain of at least one of the optical amplifiers is altered in a step S220. In the above example as described with respect to FIG. 14, the amplification gain of the currently active optical amplifier 9-1 is reduced while that of the currently inactive optical amplifier is increased. However, the reduction in amplification gain in the currently active optical amplifier is not required. An amount of time elapsed after the onset of the amplification gain alteration is monitored in a step S230, and when the elapsed time falls within a predetermined safe time range, optical lines are switched from a current optical line to a selected optical line in a step S240. Since the optical line switch takes place after a certain predetermined amount of time, even if there is an optical power increase in an output of the optical amplifier, the optical output level during and after the switch is acceptable and does not cause a harmful effect on an optical system. In order to speed up a recovery phase of the optical system after the switch, in a step S250, the amplification gain is further altered towards a normal amplification gain value.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of reducing an optical surge caused by optical amplifiers while switching from a first optical line to a second optical line, comprising the acts of:

detecting a predetermined line switching signal indicative of switching the first optical line to the second optical line;

altering an amplification gain of at least one of the optical amplifiers towards a predetermined safe gain range upon detecting the predetermined line switching signal;

continuously monitoring the amplification gain;

detecting that the amplification gain is within the predetermined safe amplification gain range; and switching from the first optical line to the second optical line upon detecting the predetermined safe gain range, wherein undesirable effects of the optical surge is substantially reduced to an acceptable level.

2. The method of reducing an optical surge according to claim 1 wherein the first optical line and the second optical line duplicate information in an optical signal prior to the switching act and share a common optical amplifier.

3. The method of reducing an optical surge according to claim 2 wherein the altering act reduces the amplification gain towards the predetermined safe gain range.

4. The method of reducing an optical surge according to claim 3 wherein the altering act further includes an act of deactivating a source of causing the amplification gain.

5. The method of reducing an optical surge according to claim 4 further includes an act of activating the source of causing the amplification gain after the switching act.

6. The method of reducing an optical surge according to claim 1 wherein an optical signal in the first optical line and the second optical line is independently amplified by a first optical amplifier and a second optical amplifier, the first optical line being active in transmitting the optical signal while the second optical line being inactive prior to the switching act.

7. The method of reducing an optical surge according to claim 6 wherein the altering act increases the amplification gain of the second optical amplifier towards the predetermined safe gain range.

8. The method of reducing an optical surge according to claim 6 wherein the altering act further includes an additional act of maintaining the amplification gain of the second amplifier within the predetermined safe gain range prior to the switching act.

9. The method of reducing an optical surge according to claim 1 further comprising an act of adjusting the amplification gain towards a predetermined normal operational value after the switching act.

10. The method of reducing an optical surge according to claim 1 further comprising acts of detecting a predetermined optical power failure condition and generating the line switching signal in response to the predetermined optical power failure condition.

11. The method of reducing an optical surge according to claim 1 further compromising acts of detecting a predetermined routing change condition and generating the line switching signal in response to the predetermined routing change condition.

12. The method of reducing an optical surge according to claim 1 wherein the switching act is completed within 10 milliseconds after the detecting act of detecting the line switching signal.

13. A method of reducing an optical surge caused by optical amplifiers while switching from a first optical line to a second optical line in response to an optical power failure, comprising the acts of:

detecting a predetermined line switching signal indicative of switching the first optical line to the second optical line;

initiating a change in amplification gain at a predetermined rate in at least one of the optical amplifiers towards a predetermined safe value upon detecting the predetermined line switching signal;

timing an elapse of a predetermined amount of time after the initiating act so that the amplification gain at least reaches the predetermined safe value; and switching from the first optical line to the second optical line after the elapse of the predetermined amount of time, wherein an amount of the optical surge is substantially reduced for undesirable effects.

14. The method of reducing an optical surge according to claim 13 wherein the predetermined amount of time includes a safety margin so that the amplification gain reaches beyond the predetermined safe value.

15. The method of reducing an optical surge according to claim 13 wherein the first optical line and the second optical line duplicate information transfer prior to the switching act and share a common optical amplifier.

16. The method of reducing an optical surge according to claim 15 wherein the initiating act reduces the amplification gain towards the predetermined safe value.

17. The method of reducing an optical surge according to claim 13 wherein an optical signal in the first optical line and the second optical line is independently amplified by a first optical amplifier and a second optical amplifier, the first optical line being active in transmitting the optical signal while the second optical line being inactive prior to the switching act.

18. The method of reducing an optical surge according to claim 17 wherein the initiating act increases the amplification gain of the second optical amplifier towards the predetermined safe gain value.

19. The method of reducing an optical surge according to claim 13 further comprising acts of detecting a predetermined optical power failure condition and generating the line switching signal in response to the predetermined optical power failure condition.

20. The method of reducing an optical surge according to claim 13 further compromising acts of detecting a predetermined routing change condition and generating the line switching signal in response to the predetermined routing change condition.

21. An optical surge reduction apparatus comprising:

an optical switch for switching between a first optical line and a second optical line in response to a switch drive signal so as to maintain an operational optical line, the first optical line and the second optical line concurrently transmitting a duplicate set of an optical signal;

an optical amplifier connected to the optical switch for amplifying the optical signal in the operational optical line at a variable amplification gain; and a control unit connected to the optical switch and the optical amplifier for detecting an optical line failure condition and for changing the variable amplification gain towards a predetermined safe amplification gain range in response to the optical line failure condition, said control unit monitoring the variable amplification gain and generating the switch drive signal upon detecting that the variable amplification gain is within the predetermined safe amplification rain range.

22. The optical surge reduction apparatus according to claim 21 wherein the control unit further comprises an optical power detection sub-unit which is connected to the operational optical line and determines whether or not the optical signal in the operational optical line is below a predetermined threshold value indicative of the line failure condition.

23. The optical surge reduction apparatus according to claim 22 wherein the control unit further comprises an amplifier control sub-unit which is connected to the optical power detection sub-unit and causes the variable amplification gain to be reduced within the predetermined safe amplification gain range in response to the line failure condition.

24. The optical surge reduction apparatus according to claim 23 wherein the control unit further comprises a switch control sub-unit which is connected to the amplifier control sub-unit and generates the switch drive signal in response to a switch ready signal.

25. The optical surge reduction apparatus according to claim 24 wherein the control unit further comprises a time counter sub-unit which is connected to the switch control sub-unit and the amplifier control sub-unit and generates the switch ready signal after a predetermined amount of time has elapsed since the amplifier control sub-unit initiates the reduction of the variable amplification gain.

26. The optical surge reduction apparatus according to claim 24 wherein the control unit further comprises a gain monitoring sub-unit connected to the optical amplifier and the switch control sub-unit for monitoring the variable amplification gain and generating the switch ready signal when the variable amplification gain reaches the predetermined safe amplification gain range.

27. An optical surge reduction unit, comprising:

an optical switch for switching in response to a switch drive signal between a first optical line and a second optical line so as to route an optical signal via either the first optical line or the second optical line;

a pair of optical amplifiers each connected to the first optical line and the second optical line for amplifying the optical signal at a variable amplification gain; and a control unit connected to the optical amplifiers and the optical switch for controlling the variable gain towards a predetermined safe amplification gain value in response to a routing change signal, said control unit monitoring the variable gain prior to generating the switch drive signal.

28. The optical surge reduction apparatus according to claim 27 wherein the control unit further comprises an amplifier control sub-unit which increases the variable amplification gain of one of the optical amplifiers that is indicated by the switch drive signal to the predetermined safe amplification gain value.

29. The optical surge reduction apparatus according to claim 28 wherein the control unit further comprises a switch control sub-unit which is connected to the amplifier control sub-unit and generates the switch drive signal in response to the routing change signal.

30. The optical surge reduction apparatus according to claim 29 wherein the control unit further comprises a time counter sub-unit which is connected to the switch control sub-unit and the amplifier control sub-unit and generates the switch ready signal after a predetermined amount of time has elapsed since the amplifier control sub-unit initiates the increase of the variable amplification gain.

31. The optical surge reduction apparatus according to claim 29 wherein the control unit further comprises a gain monitoring sub-unit connected to the optical amplifiers and the switch control sub-unit for monitoring the variable amplification gain and generating the switch ready signal when the variable amplification gain reaches the predetermined safe amplification gain value.

* * * * *

UNITED STATES PATENT AND TRADEMARK OFFICE
CERTIFICATE OF CORRECTION

PATENT NO. : 6,341,032 B1  Page 1 of 1
DATED : January 22, 2002
INVENTOR(S) : Yasuyuki Fukashiro, Hideaki Tsushima and Yukio Hayashi It is certified that error appears in the above-identified patent and that said Letters Patent is hereby corrected as shown below:

<u>Column 16,</u>
Line 23, change "rain" to -- gain --.

Signed and Sealed this

Twenty-seventh Day of August, 2002

Attest:

JAMES E. ROGAN
Attesting Officer  Director of the United States Patent and Trademark Office